March 22, 1960
L. E. ASKE
2,929,946
MOTOR ELEMENT AND METHOD OF MANUFACTURE THEREFOR
Filed Aug. 27, 1956
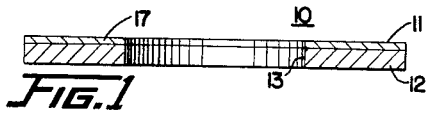
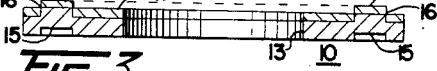
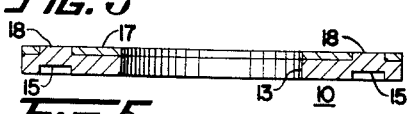
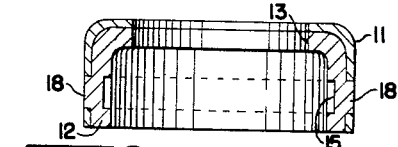
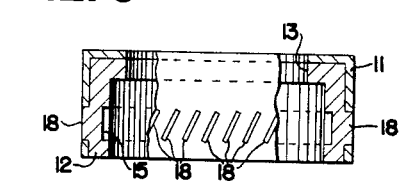
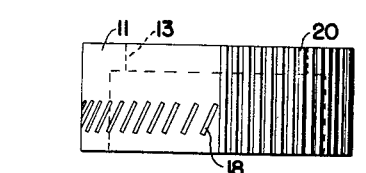
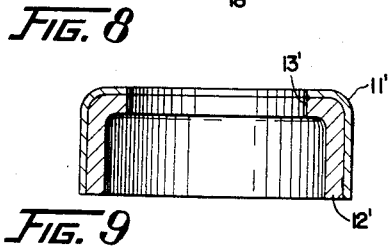
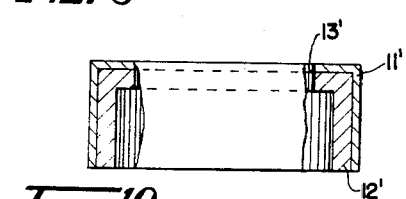
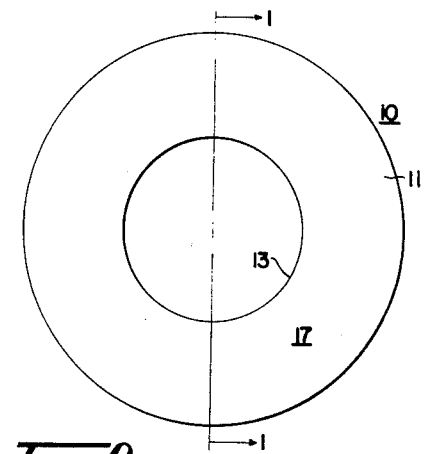
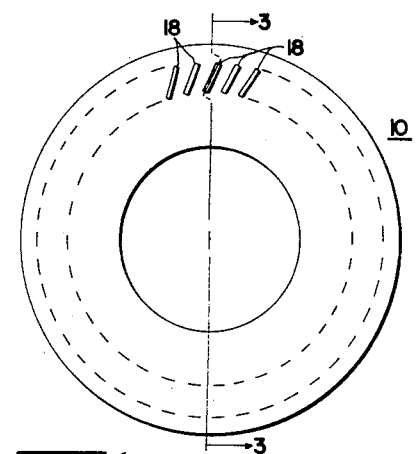
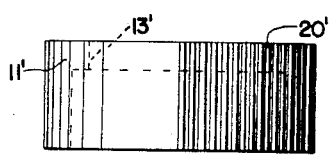
*INVENTOR.*
LEONARD E. ASKE
BY
*Joseph E Ryan*
*ATTORNEY*

United States Patent Office 2,929,946
Patented Mar. 22, 1960

2,929,946

MOTOR ELEMENT AND METHOD OF MANUFACTURE THEREFOR

Leonard E. Aske, Minneapolis, Minn., assignor to Minneapolis-Honeywell Regulator Company, Minneapolis, Minn., a corporation of Delaware Application August 27, 1956, Serial No. 606,466

5 Claims. (Cl. 310—266)

The novel device disclosed in this application is a motor element and more specifically is a rotor and a method of manufacturing the rotor.

In the manufacture of small motors, drag cup type of rotors have been utilized extensively. These rotors usually consist of a center cup or supporting structure of magnetic material and an encircling sleeve of copper or aluminum. When the rotor is relatively long as compared to its diameter it has been physically possible to manufacture a rotor having suitable electrical characteristics. Where the rotor is narrow as compared to the diameter of the device, such as in gyroscope torque rings, it has been difficult to prepare rotors having suitable torque characteristics. In the preparation of certain gyroscope torque rings the practice has been to provide a mechanical support of magnetic material into the periphery of which is cut or milled a plurality of gear teeth for transmission of the torque from the rotor to a caging mechanism. The remaining sector of the rotor surface has normally been prepared by electrodepositing a layer of high conductive material, such as copper. This type of manufacturing procedure has a major drawback in that the process of electrodepositing the conductive material is slow and has proved to be inconsistent. The deposited material varies considerably in density and therefore the torque supplied by the rotor element is not uniform. In the past it has been necessary to actually assemble a gyroscope completely to test the characteristics of the gyroscope torque rings. This was necessary as there is no visual or electrical method of checking the torque characteristics, particularly as to variations in density of the electrodeposited material, without actually testing the motor. This type of assembly procedure has become exceedingly costly and a method of preparing the gyroscope torque rings which would yield a higher percentage of usable rings became necessary.

With these problems in mind a novel method of preparing gyroscope torque rings is presented. The highly conductive copper surface is uniform and thereby eliminates the high rejection of units which has accompanied the electro-depositing method which is common in the industry today. Also, in small motor construction the drag cup type rotor has been used in lieu of a squirrel cage type rotor due to the difficulty in building a squirrel cage rotor of a small size which would be economical and have satisfactory performance characteristics. The method of preparing the motor elements, described in detail in this application as a rotor, is applicable to both a drag cup type of rotor and to a squirrel cage type of rotor.

It is an object of this invention to provide an improved motor rotor which is capable of development of higher and more uniform torques than are now available in similar devices.

It is a further object to disclose a novel method of manufacturing a motor element, such as a rotor, at a substantial cost reduction over existing methods.

Still a further object is to disclose a method of manufacturing a motor element which can be used in either an axial air gap type motor or a radial air gap type motor.

Other objects of this invention will become apparent when the following specification is considered with a single sheet of drawing, wherein:

Figures 1 and 2 are a section and plan view, respectively, of a blank of the material used;

Figures 3–8 show progressive steps in the method of manufacture of a preferred embodiment, and Figures 9–11 show a second embodiment of a rotor and the method of manufacturing it.

In Figures 1 and 2 there are disclosed two views of a blank 10 of the material from which a motor rotor is prepared. The blank 10 has a surface layer 11 of highly conductive material such as copper, and a base material 12 which is a form of magnetic iron. It will be understood that sheets of material having the surface 11 and the base 12 are commercially available and are normally referred to as copper clad magnetic iron. These sheets of material are prepared by applying pressure to two separate sheets of copper and iron and forcing the two materials to bond through molecular attraction. In the preferred embodiment sheets of copper clad iron are obtained and the blank 10 is stamped therefrom. The blank 10 is annular in shape having the central opening 13. After the blank 10 is stamped from a larger sheet, pole projections 14 are stamped, embossed, or extruded through the base material 12 thereby forming partial voids 15. It should be noted that the voids 15 are stamped to such a depth that the magnetic base material is forced to the surface of the conductive material 11, as at 16. The partial voids 15 which are stamped into the base material 12 serve no further purpose other than to raise the magnetic pole projections 14 through the surface material 11. In Figure 3 there is shown a cross section of a blank 10 having the pole projections 14 stamped therein, and in Figure 4 a top view of Figure 3. It should be noted that any number of voids 15 may be stamped into the base material 12 to form the poles 14 and that their spacing will be a function of the stator slot width arrangement used with the rotor.

After the appropriate number of pole projections 14 are stamped into the base material 12 the surface 17 is ground flat removing the conductive section of poles 14 and thereby exposing pole surfaces 18. In viewing Figure 4 it will be appreciated that the pole surfaces 18 will, in effect, be members of magnetic material entirely surrounded by a highly conductive material. These pole projections 18 therefore form the poles of a squirrel cage type of rotor.

The blank prepared and ground as shown in Figure 5 is then put into an appropriate form and drawn to the shape of a cup, as shown in Figure 6. The cup disclosed in Figure 6 can then be further processed by placing it in the proper dies and applying pressure to form the rotor of Figure 7. It is apparent that the rotor disclosed in Figure 7 approaches the configuration of a normal squirrel cage rotor and that by supporting the rotor by means of opening 13 the rotor could be used in a conventional manner. Figure 7 further discloses a partial side view of the rotor and the exposed pole surfaces 18. It will be noted that the rectangular skewed iron configuration will be skewed at some angle which is determined by the width of the stator field slot opening between the two poles, and the number of skewed bars will be of a great enough number so that as one bar is leaving the stator slot another is entering the slot. This is to prevent so called cogging (magnetic) effect in an induction motor; as is well known to those versed in the art.

Figure 8 is a side view of the completed rotor element into which a plurality of gear teeth 20 has been cut. The gear teeth 20 are cut deep enough to remove part of the surface covering 11 and part of the base 12. The teeth are not, however, cut deep enough to enter any of the partial voids 15. With the teeth 20 cut into the rim of the rotor the unit disclosed can be used as a gyroscope torque ring. In the use of a gyroscope torque ring, only small amounts of rotation are required and the gears 20 therefore never come directly into the field established by a stator member (not shown). This arrangement is well known to those versed in the gyroscope art and this arrangement is used conventionally as a caging mechanism for the gyroscope.

In Figures 8-11 there are shown views of a rotor element of a drag cup type rotor. The drag cup type rotor requires no physical poles and is therefore formed of a conductive surface 11' and a base 12'. This rotor has an opening 13' and is formed from a blank disclosed in Figures 1 and 2. The first forming step is similar to the step utilized in forming the blank from Figure 5 to Figure 6.

Figure 10 discloses a finished drag cup type rotor which is similarly formed as that shown in Figure 7. In Figure 11 the drag cup rotor has gear teeth 20' cut into its surface and this arrangement is similar to that shown in Figure 8 with the exception that no pole teeth are present.

It is apparent from the above description that a novel device and method for preparing the device has been disclosed. While preferred embodiments of the rotor elements have been shown it is apparent that a device could be formed in which two conductive layers and a single base material of magnetic characteristic could be used in forming either or both of the types of rotors disclosed in Figures 1-11. It should be further noted that the unit shown in Figure 5 could be used as a rotor element in an axial air gap type of motor and would not require the final finishing steps shown in Figures 6-8. Other modifications of the method and device disclosed will become apparent to those versed in the art and therefore the applicant wishes to be limited in the scope of his invention only by the appended claims.

I claim as my invention:

1. A method of forming a motor element of the class described from a blank having a magnetic base and a surface covering of electrically conductive material comprising the steps of: raising a plurality of pole members through the surface of the blank; and removing the raised material thereby exposing the pole members of the magnetic material.

2. A method of forming a motor element of the class described from a blank having a magnetic base and a surface covering of electrically conductive material comprising the steps of: embossing a plurality of pole members from the magnetic base through the conductive surface of the blank; and removing the raised material and thereby exposing the pole members of the magnetic base.

3. A method of forming a motor element of the class described from a blank having a magnetic base and a surface covering of electrically conductive material comprising the steps of: embossing a plurality of pole members from the magnetic base through the conductive surface; removing the raised portion and thereby exposing the pole members of the magnetic base; and forming the blank into a cup having the pole members spaced on the rim of the cup.

4. A method of forming a motor element of the class described from a blank having a magnetic base and a cladding of electrically conductive material comprising the steps of: embossing a plurality of pole members from the magnetic base through the conductive cladding; removing the embossment flush with the cladding and thereby exposing the pole members of the magnetic base; and forming the blank into a cup having the pole members uniformly spaced on the rim of the cup.

5. In a torque motor: a cup-shaped rotor member comprised of a material having a magnetic base and a conductive surface; said cup-shaped member having a hub and an integral rim including gear teeth output means on a sector thereof; and a plurality of pole members formed from the magnetic base material of said rim portion and leaving partial voids therein; said pole members passing through said conductive surface and being surrounded thereby.

References Cited in the file of this patent

UNITED STATES PATENTS

| | | |
|---|---|---|
| 1,695,884 | Conant | Dec. 18, 1928 |
| 2,020,090 | Weed | Nov. 5, 1935 |
| 2,316,960 | Ingersoll | Apr. 20, 1943 |
| 2,518,483 | Mapes | Aug. 15, 1950 |
| 2,779,882 | Kazuo Ishikawa | Jan. 29, 1957 |

FOREIGN PATENTS

| | | |
|---|---|---|
| 1,123,229 | France | June 4, 1956 |